United States Patent
Strand

(10) Patent No.: US 9,868,257 B1
(45) Date of Patent: Jan. 16, 2018

(54) OBJECT FABRICATION SYSTEM

(71) Applicant: AMAZON TECHNOLOGIES, INC., Reno, NV (US)

(72) Inventor: William Alexander Strand, Issaquah, WA (US)

(73) Assignee: Amazon Technologies, Inc., Reno, NV (US)

(*) Notice: Subject to any disclaimer, the term of this patent is extended or adjusted under 35 U.S.C. 154(b) by 459 days.

(21) Appl. No.: 14/459,040

(22) Filed: Aug. 13, 2014

(51) Int. Cl.
*B29C 67/00* (2017.01)

(52) U.S. Cl.
CPC .................. *B29C 67/0088* (2013.01)

(58) Field of Classification Search
CPC .. B29C 67/0059; B29C 67/0088; B33Y 30/00
See application file for complete search history.

(56) References Cited

U.S. PATENT DOCUMENTS

| | | | | |
|---|---|---|---|---|
| 2011/0121476 A1* | 5/2011 | Batchelder | ........... | B65H 49/322 264/40.1 |
| 2014/0200697 A1* | 7/2014 | Cheng | ................... | G06Q 30/06 700/98 |
| 2014/0283104 A1* | 9/2014 | Nilsson | ................... | G06F 21/10 726/26 |
| 2015/0045934 A1* | 2/2015 | Kallenbach | ......... | B29C 67/0051 700/120 |
| 2015/0165690 A1* | 6/2015 | Tow | ....................... | B33Y 80/00 700/119 |
| 2016/0339640 A1* | 11/2016 | Juan | ..................... | B29C 67/0085 |

* cited by examiner

*Primary Examiner* — Joseph S Del Sole
*Assistant Examiner* — Cedrick S Williams
(74) *Attorney, Agent, or Firm* — Lindauer Law, PLLC

(57) ABSTRACT

A starter may be used to facilitate fabrication of objects from an automated fabrication device, such as a 3-D printer. In one implementation, the starter may include a starter memory storing encrypted fabrication instructions and feedstock material that encodes the cryptographic key suitable for decrypting the encrypted fabrication instructions. The cryptographic key is accessed and used to generate decrypted fabrication instructions from the encrypted fabrication instructions. Subsequent fabrication consumes or changes the feedstock material such that the data stored thereon is destroyed or otherwise inaccessible.

20 Claims, 9 Drawing Sheets

OBJECT FABRICATION SYSTEM

BACKGROUND

Fabrication of all or part of an object using automated fabrication devices such as three-dimensional (3D) printers, computer-controlled milling machines, and so forth, offers the ability for users to procure objects on demand, procure objects that are customized, and so forth.

While a hobbyist may be willing to distribute without control fabrication instructions for creating an object, others may wish to maintain control over the fabrication of the object. For example, a toymaker may wish to limit the conditions under which a particular toy is fabricated. Furthermore, some objects may require specialized components that are not able to be fabricated by an automated fabrication device available to the user. The user may benefit from an improved ability to fabricate the desired object.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
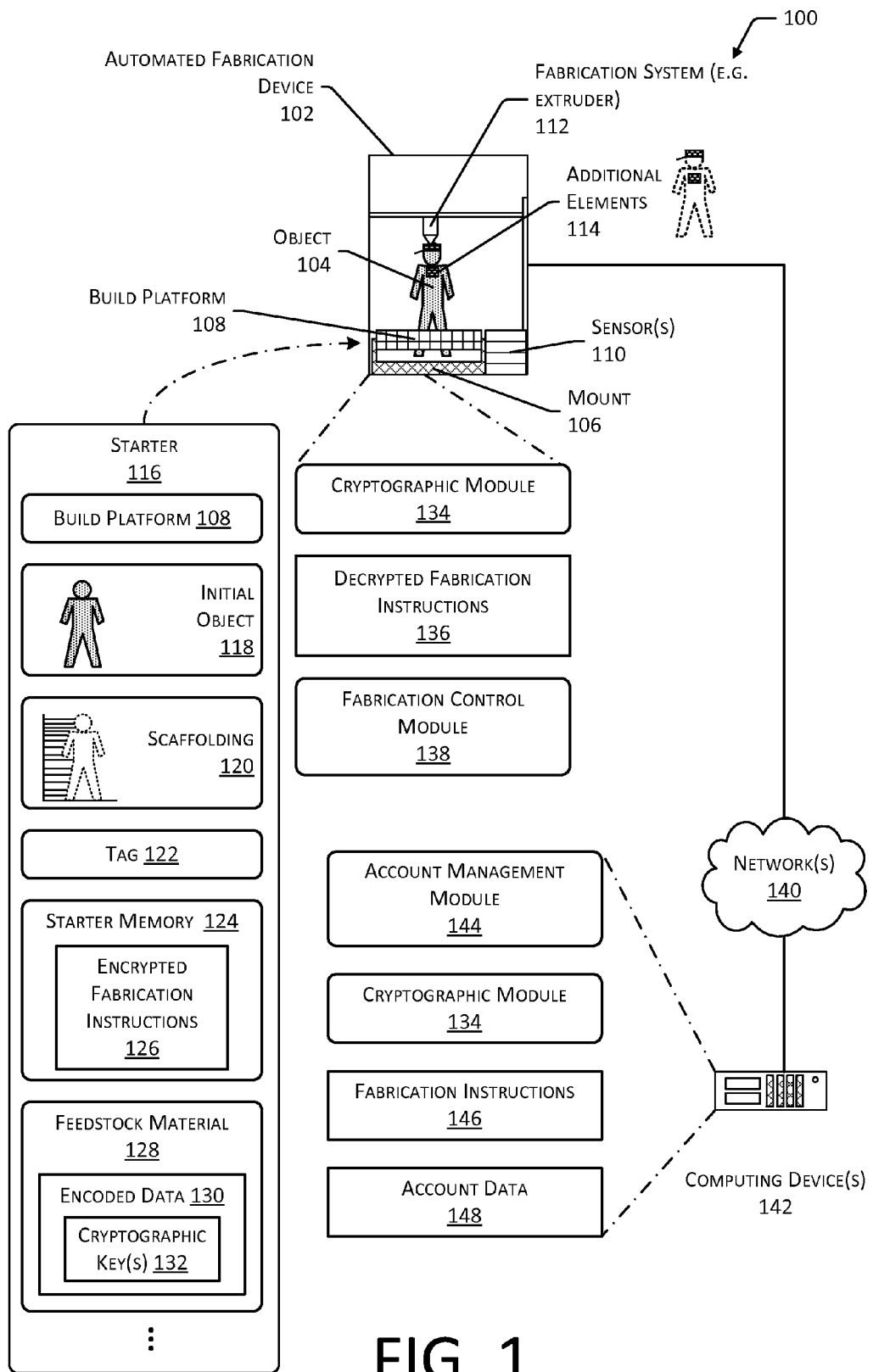
FIG. 1 is an illustrative system of an automated fabrication device configured to use a starter to fabricate at least a portion of an object.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Objects may be fabricated, at least in part, by automated fabrication devices (AFDs) such as 3-D printers, computer numerical controlled (CNC) machines, and so forth. As AFDs continue to increase in capability and decrease in cost, availability of these devices has grown. AFDs may be used in homes, small businesses, retail stores, distribution centers, and so forth, to provide objects for use. For example, the objects may comprise repair parts such as gears, clips, frames, and so forth. In another example, the objects may comprise toys, household goods, appliances, tools, and so forth.

AFDs may utilize additive techniques, subtractive techniques, or both. Additive techniques selectively apply or manipulate portions of a feedstock material to form a portion of the object. For example, additive techniques include extrusion of a polymer from an extruder and depositing the polymer at particular positions. In another example, additive techniques include selective heating of a powder to produce the object by way of sintering. A wide variety of additive techniques are available. In comparison, subtractive techniques remove material from the feedstock material. For example, a cutting head may be used to remove material from a block of feedstock material to form the object.

Traditionally, a user of an AFD has been responsible for much of the set up involving the AFD. For example, the user may procure and load the feedstock material, create or otherwise access fabrication instructions to direct the AFD to create an object, configure a build platform upon which the object is to be fabricated, and so forth. However, this may call for skill, time, or other capabilities that the user or the AFD itself is unable or unwilling to provide. Furthermore, intellectual property protection for objects created using the AFD traditionally has been limited or nonexistent. As a result, the AFD may be underutilized.

Described in this disclosure are techniques and devices suitable for facilitating and improving the operation of an AFD. The AFD may be configured to accept portions of, or coupled to, a "starter". The starter may be deployed in form factors such as a cartridge, enclosure, kit, and so forth.

The starter may comprise one or more of a build platform, an initial object, scaffolding, a tag, starter memory, or feedstock material. The build platform may comprise a surface upon which the object is to be fabricated. For example, the build platform may comprise a stage upon which a polymer may be deposited by a print head or extruder. The initial object may comprise a template, partial portion, framework, interior structure, and so forth, onto which additional elements may be printed. In some implementations, the initial object may include kit parts such as electronic or optical components that are not able to be fabricated by the AFD. The scaffolding may comprise temporary structures used to support the object or a portion thereof during fabrication but that are intended to be removed after completion of the object. The tag may be configured to store information such as identifying the particular starter, providing item number(s) indicative of the object(s) to be fabricated using the starter, and so forth. For example, the tag may comprise a radio frequency identification tag or a barcode.

The starter memory of the starter may be configured to store fabrication instructions. The starter memory may comprise the computer readable storage media (CRSM) such as flash memory, magnetic media, optical media, and so forth. For example, the starter memory may comprise a 1 gigabyte (GB) flash memory device configured to couple to a Universal Serial Bus (USB) interface. The starter memory may be configured to store all or a portion of the fabrication instructions used to fabricate the object. For example, the AFD may be configured to begin fabrication of the object after coupling to the starter and accessing the fabrication instructions.

The fabrication instructions stored in the starter memory may be encrypted as encrypted fabrication instructions. The encryption may be used to prevent fabrication of counterfeit objects, restrict use of the starter to particular AFDs, and so forth. Additionally, by storing at least a portion of the fabrication instructions in the starter memory, the need for a network connection to download or otherwise transfer fabrication instructions from a server or other computing device may be reduced or eliminated.

In one implementation, cryptographic keys for use in decrypting the encrypted fabrication instructions may be retrieved from the feedstock material provided with the starter. The feedstock material may manifest encoded data, such as a pattern that may be expressed and used as a cryptographic key. The pattern (representative of input data) may be impressed on the feedstock material during creation of the starter, or the pattern may be inherent within the feedstock material itself. For example, the impressed pattern may be a series of optically readable marks placed along a link of filament feedstock material, representing input data. Continuing the example, binary data may be encoded by placing pits or grooves along the feedstock material that may be read optically. In another example, the inherent pattern may result from the creation of the feedstock material itself, such as natural variations in color, density, dielectric constant, and so forth. Continuing the example, variations in diameter of the filament may be used to produce a string of output data that may then be used to generate cryptographic keys.

During the fabrication of the object, the AFD consumes at least a portion of the feedstock material. As a result of the consumption, at least a portion of the encoded data may be destroyed. Once destroyed, the encoded data may no longer be available. For example, the encoded data may include a cryptographic key to decrypt a portion of the encrypted fabrication instructions. Continuing the example, during fabrication of the portion of the object using the portion of the encrypted fabrication instructions, the feedstock material that stores the cryptographic keys for that portion of the encrypted fabrication instructions is consumed.

In another implementation, the cryptographic keys for use in decrypting the encrypted fabrication instructions stored in the starter memory may be retrieved from another computing device, such as a server. For example, the starter identification number stored in the tag may be provided to the server. The server may then return a cryptographic key suitable for decrypting the encrypted fabrication instructions. The AFD may generate decrypted fabrication instructions from the encrypted fabrication instructions using the cryptographic key. The decrypted fabrication instructions may then be used to fabricate the object.

By utilizing the AFD and the starter to create at least a portion of the object, several benefits may be realized. For example, shipping costs may be minimized due to reductions in volume as the starters may occupy less volume or may include less material than the finished object. In another example, by providing feedstock material in the starter, material of known composition may be used in fabrication, improving the quality of the finished object in comparison to potentially variable or unknown feedstock material provided by an operator of the AFD for fabrication. In yet another example, providing an initial object, scaffolding, or other partially completed portion of the object may reduce fabrication time, improve overall quality of the finished object, and so forth. Additionally, use of the starter may improve security for the intellectual property of the object, such as assisting in control of the distribution of the fabrication instructions used to fabricate the object.

Illustrative System

FIG. 1 is an illustrative system 100 for automated fabrication of an object. In this illustration, an automated fabrication device (AFD) 102 is depicted. The AFD 102 may use one or more of additive manufacturing, subtractive manufacturing, or both, to create at least a portion of an object 104. For example, the AFD 102 may comprise an additive three-dimensional (3D) printer, such as the "MakerBot Replicator" from MakerBot Industries LLC of Brooklyn, N.Y., USA; the "3D Printer Creator" from Zhejiang Flashforge 3D Technology Co. Ltd., of Zhejiang, China; and so forth.

The AFD 102 may include a mount 106 configured to couple to a build platform 108. The build platform 108 may comprise a surface, chamber, container, and so forth, configured to hold the object 104, or portions thereof, during fabrication. In some implementations, the build platform 108 may be configured with mounting attachment points suitable for holding the object 104 during fabrication. The build platform 108 may also include one or more of heating devices, release agents, cooling devices, and so forth. The mount 106 may comprise a frame, clips, mechanical engagement features, and so forth, configured to retain at least a portion of the build platform 108 during operation of the AFD 102.

The AFD 102 may include one or more sensors 110. The sensors 110 are configured to gather sensor data associated with operation of AFD 102. For example, the sensors 110 may be configured to monitor consumption of feedstock material, monitor conditions of the build platform 108, and so forth.

The AFD 102 may include one or more fabrication systems 112. The fabrication systems 112 are configured to deposit, distribute, manipulate, shape, mill, drill, or otherwise modify feedstock material to form the object 104. The fabrication systems 112 may implement additive techniques, subtractive techniques, or both, to form at least a portion of the object 104 during fabrication. Additive techniques selectively apply or manipulate portions of the feedstock material to form a portion of the object 104. For example, additive techniques include extrusion of a polymer from an extruder and depositing the polymer at particular positions. In another example, additive techniques include selective heating of a powder to produce the object 104 by way of sintering. A wide variety of additive techniques are available, including, but not limited to, extrusion deposition, granular material binding, lamination, photopolymerization, stereolithography, and so forth. In comparison, subtractive techniques remove material from the feedstock material. For example, a cutting or milling head may be used to remove material from a block of feedstock material to form the object 104.

In some implementations, the AFD 102 may be configured to add one or more additional elements 114 to the object 104. For example, the object 104 may comprise a toy figurine and the additional elements 114 may include a hat and a backpack. The additional elements 114 may be joined or bonded to the object 104, or may be pieces which may be attached to the object 104. For example, the additional element 114 of the hat may be removable, while the backpack may be joined to a dorsal section of the figurine object 104.

The AFD 102 is configured to accept portions of, or be coupled to, a starter 116. The starter 116 may be deployed in form factors such as a cartridge, enclosure, kit, and so forth. In some implementations, the starter 116 may include a build platform 108. For example, operation of some additive fabrication systems 112 may result in the build platform 108 being littered with byproducts of the fabrication process. By including the build platform 108 within the starter 116, a known good starting point for the fabrication is provided. The build platform 108 as included in the starter 116 may result in improved quality of the fabricated object 104.

An initial object 118 may be included with the starter 116. The initial object 118 may comprise one or more previously completed elements of the object 104. For example, the initial object 118 may include a template, partial portion, framework, interior structure, and so forth, onto which additional elements 114 may be printed to form the finished object 104. For example, the initial object 118 may comprise an anthropomorphic shape, onto which additional elements 114 such as body contours and facial features may be applied to produce a particular figurine. In some implementations, the initial object 118, or the starter 116, may include other parts. For example, electronic or optical components that are not able to be fabricated by the AFD 102 may be included for inclusion into the object 104 during or after fabrication. In some implementations, the initial object 118 may be joined by way of one or more temporary or removable members to the build platform 108.

Scaffolding 120 may also be included with the starter 116. The scaffolding 120 may comprise temporary structures used to support the object 104 or a portion thereof during fabrication. The scaffolding 120 is intended to be removed after completion of the object 104. For example, the scaffolding 120 may be configured to support an outstretched arm of the figurine during fabrication to prevent sagging during fabrication. In some implementations, the scaffolding 120 may comprise a material different from that used to fabricate the object 104. For example, the scaffolding 120 may comprise a water-soluble material such that the object 104 and scaffolding 120 may be immersed in water after fabrication is complete, with the water causing the scaffolding 120 to disassociate from the object 104. In some implementations, the scaffolding 120 may be joined to the build platform 108.

A tag 122 may be provided with the starter 116. The tag 122 may be configured to store information. In one implementation, the information stored by the tag 122 may include a starter identifier configured to identify the particular starter 116, an item number(s) indicative of the object(s) 104 to be fabricated using the starter 116, and so forth. For example, the tag 122 may comprise a radio frequency identification (RFID) tag, machine-readable optical code such as a barcode or matrix code, and so forth.

The starter 116 may include one or more starter memory 124 devices. The starter memory 124 may be configured to store fabrication instructions. The starter memory 124 may comprise the computer readable storage media (CRSM). The CRSM may be any one or more of an electronic storage medium, a magnetic storage medium, an optical storage medium, a quantum storage medium, a mechanical computer storage medium, and so forth. For example, the starter memory 124 may comprise flash memory, magnetic media, optical media, and so forth. The starter memory 124 may comprise media alone, or may include one or more electronic or optical components configured to access the starter memory 124. For example, in some implementations, the starter memory 124 may include a Universal Serial Bus (USB) interface.

The starter memory 124 may be configured to store all or a portion of the fabrication instructions used to fabricate the object 104, or a portion thereof. In some implementations, the starter memory 124 may store encrypted fabrication instructions 126. The encrypted fabrication instructions 126 may be encrypted using one or more cryptographic techniques. For example, the encrypted fabrication instructions 126 may be encrypted using a symmetric key, public-private key pair, and so forth.

Feedstock material 128 may be included with the starter 116. The feedstock material 128 comprises one or more materials suitable for use by the fabrication system 112 of the AFD 102 to produce at least a portion of the object 104 or the additional elements 114. The feedstock material 128 may include, but is not limited to, a polymer, metal, ceramic, and so forth.

Inclusion of feedstock material 128 with the starter 116 may be used to maintain quality control over the object 104. For example, an object 104 may include or be associated with a particular brand name, logo, or trademark, which may be associated with a particular degree of quality. By including at least a portion of the feedstock material 128 in the starter 116, quality of the finished object 104, in accordance with the desired degree of quality, may be maintained.

The feedstock material 128 may be provided in one or more form factors including, but not limited to: powder, pellets, filaments, strips, sheets, gel, liquid, and so forth. For example, where the feedstock material 128 comprises a filament, the feedstock material 128 may be stored on a feedstock material spool within the starter 116. During operation of AFD 102, the feedstock material 128 may be distributed to the fabrication system 112 which consumes the feedstock material 128 to produce at least a portion of the object 104. The consumption of feedstock material 128 may comprise hardening, melting, sintering, milling, and so forth.

The feedstock material 128 may manifest encoded data 130. The encoded data 130 may comprise a pattern present within the feedstock material 128 but not explicitly impressed thereupon. For example, the encoded data 130 may comprise an inherent pattern resulting from the creation of the feedstock material 128. For example, the inherent pattern may comprise a random series of striations on a surface of a filament of feedstock material 128. In comparison, the encoded data 130 may comprise a pattern from input data which is been impressed upon, or otherwise written to, the feedstock material 128. For example, during preparation of the starter 116, a portion of the feedstock material 128 filament may be modified to present features indicative of binary ones and zeroes. Continuing the example, grooves and pits may be melted into the feedstock material 128 using infrared light. In some implementations, different portions or sections of the encoded data 130 may be interleaved with one another. The encoded data 130 may include parity values, tracking or alignment values, cyclic redundancy check values, and so forth.

As described above, the starter memory 124 may store encrypted fabrication instructions 126. The encrypted fabrication instructions 126 may be encrypted using one or more cryptographic keys 132(1), 132(2), ..., 132(K). As used in this disclosure, letters in parenthesis such as "(K)" indicate an integer value. The cryptographic keys 132 may comprise asymmetric keys, public keys, private keys, and so forth.

In some implementations, the encoded data 130 of the feedstock material 128, either inherent or impressed, may be used as a cryptographic key 132 or to generate the cryptographic key 132. For example, a random pattern of surface features on a filament of feedstock material 128 may be scanned to produce a binary pattern which may then be used as the cryptographic key 132.

In some implementations, the starter 116 may include other items (not shown). For example, the starter 116 may include one or more of print heads, extruders, tools, solvents, paints, surface coating materials, and so forth. One or more of the components of the starter 116 as described herein may be implemented in various configurations. For example, the build platform 108 may be configured to hold or retain the tag 122 and the starter memory 124. In another example, the build platform 108 may be configured to hold or retain the feedstock material 128.

The AFD 102 may include a cryptographic module 134. The cryptographic module 134 is configured to accept one or more cryptographic keys 132 and either encrypt or decrypt information including, but not limited to, fabrication instructions. For example, the cryptographic module 134 may receive the cryptographic keys 132 as output from one or more sensors 110 during consumption of the feedstock material 128. The cryptographic module 134 may use the cryptographic key 132 to decrypt the encrypted fabrication instructions 126 and generate decrypted fabrication instructions 136. The decrypted fabrication instructions 136 may then be processed by a fabrication control module 138. The fabrication control module 138 is configured to use the decrypted fabrication instructions 136 or unencrypted fabrication instructions to direct operation of the fabrication system 112 or other systems of the AFD 102. The AFD 102 is discussed in more detail below with regard to FIG. 2.

The AFD 102 may couple to one or more networks 140. The networks 140 may include public networks, private networks, or a combination thereof. The networks 140 may include, but are not limited to, personal area networks (PANs), local area networks (LANs), wide area networks (WANs), and so forth. The networks 140 may communicate using Ethernet, Wi-Fi, Bluetooth, ZigBee, 3G, 4G, or other technologies.

A computing device 142 such as a server is coupled to the network 140 and is in communication with one or more of the AFD 102, other computing devices 142, and so forth. The computing device 142 may comprise one or more physical computing devices, virtual computing devices, or utilize a combination thereof. In some implementations, the computing device 142 may not require end-user knowledge of the physical location and configuration of the system that delivers the services. For example, the server computing devices 142 may be described using expressions including, but not limited to, "on-demand computing", "software as a service (SaaS)", "platform computing", "network-accessible platform", "cloud services", "data centers", and so forth. Services provided by the computing device 142 may be distributed across one or more physical or virtual devices.

The computing device 142 may include one or more modules and data including, but not limited to, an account management module 144, a cryptographic module 134, fabrication instructions 146, account data 148, and so forth. The account management module 144 may be configured to exchange information with the AFD 102, such as data from the tag 122. The account management module 144 may be configured to retrieve fabrication instructions 146 associated with the object 104 specified by the tag 122. Once retrieved, the fabrication instructions 146 may be provided to the AFD 102.

The fabrication instructions 146 may include unencrypted fabrication instructions, encrypted fabrication instructions 126, decrypted fabrication instructions 136, and so forth. In some implementations, the fabrication instructions 146 may comprise information to construct less than the complete object 104. For example, the fabrication instructions 146 may comprise instructions to convert the initial object 118 to the finished object 104 by adding one or more additional elements 114.

The account data 148 may comprise information about the AFD 102, information indicative of use rights associated with the fabrication instructions 146, and so forth. The account data 148 may be used by the account management module 144 during operation. In one implementation, the account management module 144 may be configured to track fabrication statistics, such as when the object 104 has been fabricated, and associate that information with a particular account. This information may be stored as the account data 148 for billing, process improvement, logistical support, and so forth. In another implementation, the account management module 144 may be configured to provide encrypted fabrication instructions 126 to the AFD 102. Distribution of the encrypted fabrication instructions 126 may be based at least in part on account data 148 indicating that the AFD 102 or a starter 116 has privileges to fabricate the object 104. For example, the AFD 102 may request the encrypted fabrication instructions 126 associated with the starter 116. Continuing the example, after confirming the starter 116 has privileges, the encrypted fabrication instructions 126 may be sent.

Figure 2:
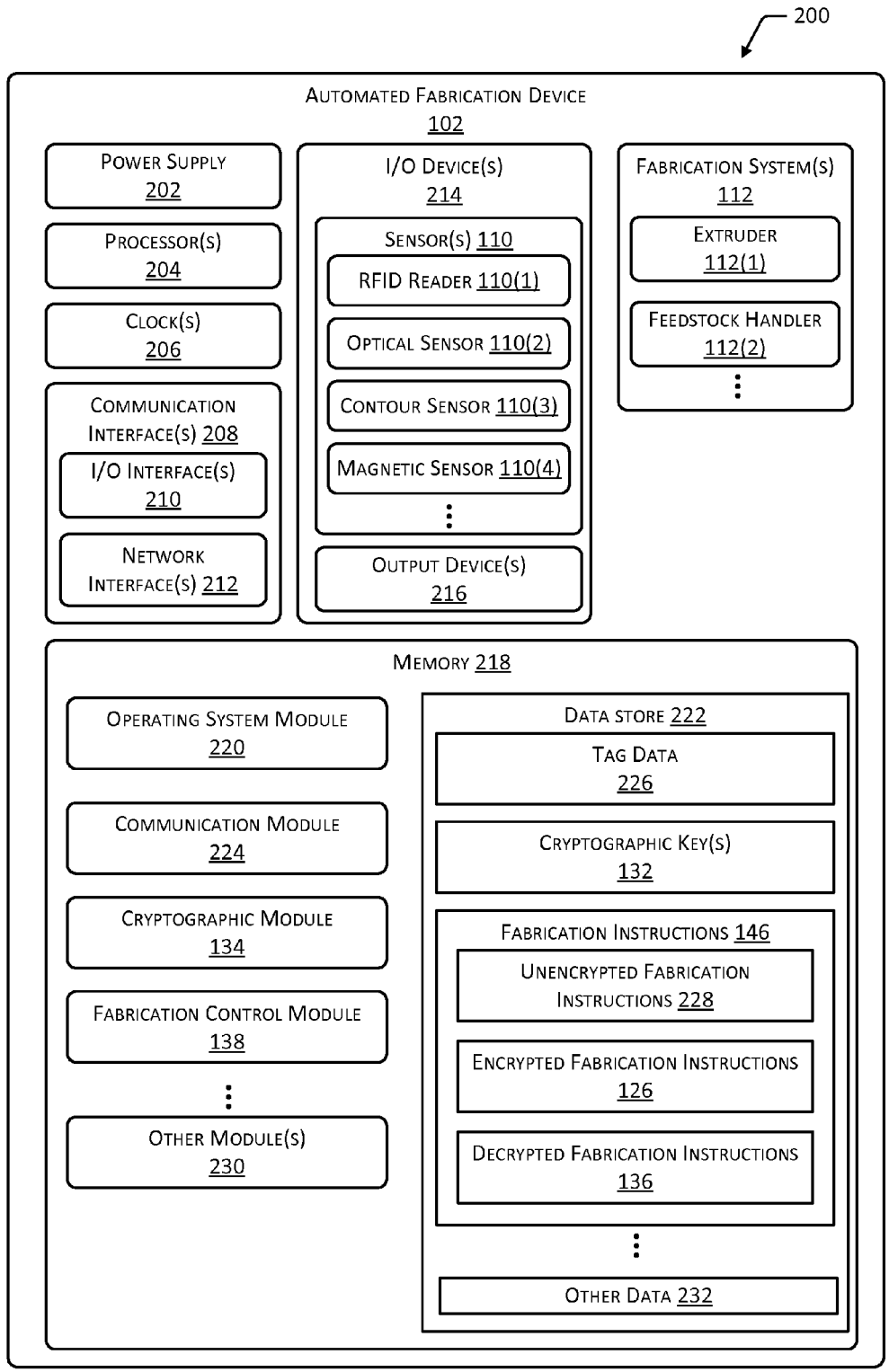
FIG. 2 illustrates a block diagram of the automated fabrication device configured to fabricate the object using the starter.

FIG. 2 illustrates a block diagram 200 of the AFD 102 configured to use the starter 116 to fabricate an object 104. One or more power supplies 202 are configured to provide electrical power suitable for operating the components in the AFD 102. In some implementations, the power supply 202 may comprise a rechargeable battery, fuel cell, photovoltaic cell, power conditioning circuitry, mains power, and so forth.

The AFD 102 may include one or more hardware processors 204 (processors) configured to execute one or more stored instructions. The processors 204 may comprise one or more cores. One or more clocks 206 may provide information indicative of date, time, ticks, and so forth. For example, the processor 204 may use data from the clock 206 to generate cryptographic keys 132, determine the cryptographic keys 132 are still valid, determine if an expiration date for the feedstock material 128 has passed, and so forth.

The AFD 102 may include one or more communication interfaces 208 such as I/O interfaces 210, network interfaces 212, and so forth. The communication interfaces 208 enable the AFD 102, or components thereof, to communicate with other devices or components. The communication interfaces 208 may include one or more I/O interfaces 210. The I/O interfaces 210 may comprise interfaces such as Inter-Integrated Circuit (I2C), Serial Peripheral Interface (SPI), Universal Serial Bus (USB) as promulgated by the USB Implementers Forum, RS-232, and so forth.

The I/O interface(s) 210 may couple to one or more I/O devices 214. The I/O devices 214 may include input devices such as one or more of a sensor 110, keyboard, mouse, scanner, and so forth.

The sensors 110 may include an RFID reader 110(1), near field communication (NFC) systems, and so forth. The starter 116, the user, or other objects may be equipped with one or more tags 122. In some implementations, the tags 122 may comprise radio frequency (RF) tags. The RF tags are configured to emit an RF signal. In one implementation, the RF tag may be a radio frequency identification (RFID) tag configured to emit the RF signal upon activation by an external signal. For example, the external signal may comprise a RF signal or a magnetic field configured to energize or activate the RFID tag. In another implementation, the RF tag may comprise a transmitter and a power source configured to power the transmitter. For example, the RF tag may comprise a Bluetooth Low Energy (BLE) transmitter and battery.

In other implementations, the tag 122 may use other techniques to indicate its presence or provide data. For example, an acoustic tag may be configured to generate an ultrasonic signal which is detected by corresponding acoustic receivers. In yet another implementation, the tag 122 may be configured to emit an optical signal, such as a predetermined pulse or pattern of light.

An optical sensor 110(2) is configured to generate data responsive to light. The light may comprise one or more of infrared, visible, ultraviolet, or other wavelengths of light. The optical sensor 110(2) may comprise a photodiode, photodetector, charge coupled device, complementary metal oxide semiconductor device, microbolometer, and so forth. In some implementations, the optical sensor 110(2) may comprise a plurality of elements configurable to generate an image. For example, the optical sensor 110(2) may comprise an optical emitter configured to emit light and an optical receiver configured to receive reflected or fluoresced light. In some implementations, the encoded data 130 may be represented as variations in color of at least a portion of the feedstock material 128. Continuing the example, the optical sensor 110(2) may be used to read an optically readable pattern present on or within the feedstock material 128.

A contour sensor 110(3) may be configured to determine one or more surface characteristics or shape of at least a portion of the feedstock material 128. The contour sensor 110(3) may comprise a contact element configured to touch at least a portion of the feedstock material 128, or the contour sensor 110(3) may comprise a non-contact device. For example, the contact sensor 110(3) may comprise a member or probe such as a metal whisker that is drawn across a portion of the feedstock material 128 to determine a surface contour such as the presence of a declivity or prominence on the surface. In some implementations, the encoded data 130 may be represented as variations in contour of at least a portion of the feedstock material 128.

A magnetic sensor 110(4) may comprise a magnetometer, coil, semiconductor device, and so forth, which is sensitive to a magnetic field. For example, the magnetic sensor 110(4) may be configured to detect magnetic fields present within at least a portion of the feedstock material 128. These variations in the magnetic fields may be used to store the encoded data 130.

In other implementations, other sensors 110(S) (not shown) may be present. For example, a capacitive sensor may be configured to determine capacitance of at least a portion of the feedstock material 128. In another example, a range camera or 3D sensor may be configured to generate 3D data about the object 104 before, during, or after fabrication of the object 104. The 3D data may be used to validate fabrication of the object 104, provide quality assurance information, and so forth.

As described above, the AFD 102 may incorporate one or more fabrication systems 112. For example, where the fabrication system 112 uses an extrusion additive process, an extruder 112(1) may be configured to extrude or otherwise emit at least a portion of feedstock material 128 selectively. In another example, the fabrication system 112 may comprise a laser configured to sinter at least a portion of the feedstock material 128. A feedstock handler 112(2) may comprise one or more mechanisms configured to direct at least a portion of the feedstock material 128 from the starter 116 or other reservoir or storage location for feedstock material 128 that is external to the starter 116. The feedstock handler 112(2) may comprise motors, rollers, guides, and so forth.

The I/O devices 214 may also include output devices 216 such as one or more of a display, printer, audio speakers, and so forth. In some embodiments, the I/O devices 214 may be physically incorporated with the AFD 102 or may be externally placed. For example, the AFD 102 may be in communication with a smartphone, tablet, or other computing device that may be used to provide a user interface and receive input from a user.

The network interfaces 212 are configured to provide communications between the AFD 102 and other devices, such as the sensors 110, routers, access points, computing devices 142, and so forth. The network interfaces 212 may include devices configured to couple to PANs, LANs, WANs, and so forth. For example, the network interfaces 212 may include devices compatible with Ethernet, Wi-Fi, Bluetooth, ZigBee, 3G, 4G, LTE, and so forth.

The AFD 102 may also include one or more busses or other internal communications hardware or software that allow for the transfer of data between the various modules and components of the AFD 102.

As shown in FIG. 2, the AFD 102 includes one or more memories 218. The memory 218 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 218 provides storage of computer-readable instructions, data structures, program modules, and other data for the operation of the AFD 102. A few example functional modules are shown stored in the memory 218, although the same functionality may alternatively be implemented in hardware, firmware, or as a system on a chip (SOC).

The memory 218 may include at least one operating system (OS) module 220. The OS module 220 is configured to manage hardware resource devices such as the I/O interfaces 210, the network interfaces 212, the I/O devices 214, and provide various services to applications or modules executing on the processors 204. The OS module 220 may implement a variant of the FreeBSD operating system as promulgated by the FreeBSD Project; other UNIX or UNIX-like operating system; a variation of the Linux operating system as promulgated by Linus Torvalds; the Windows operating system from Microsoft Corporation of Redmond, Wash., USA; or other operating systems.

Also stored in the memory 218 may be a data store 222 and one or more of the following modules. These modules may be executed as foreground applications, background tasks, daemons, and so forth. The data store 222 may use a flat file, database, linked list, tree, executable code, script, or other data structure to store information. In some implementations, the data store 222 or a portion of the data store 222 may be distributed across one or more other devices including the computing devices 142, network attached storage devices, and so forth.

A communication module 224 may be configured to establish communications with one or more of the computing devices 142, sensors 110 external to the AFD 102, or other devices. The communications may be authenticated, encrypted, and so forth. For example, the communication module 224 may be configured to implement Transport Layer Security (TLS). In one implementation, the communication module 224 may use the cryptographic key 132 to establish an encrypted connection with the computing device 142 such as the server.

The memory 218 may also store cryptographic module 134. As described above, the cryptographic module 134 is configured to accept one or more cryptographic keys 132 and either encrypt or decrypt information including, but not limited to, fabrication instructions 146. The cryptographic keys 132 may be stored in the data store 222. In some implementations, the cryptographic module 134 may use a plurality of techniques to maintain cryptographic security of information. For example, the cryptographic module 134 may use a public key/private key pair to exchange symmetric key values. The cryptographic module 134 may be configured to implement one or more of a block cipher, stream cipher, and so forth. For example, the cryptographic module 134 may implement a variation of the RC4 cipher as originally designed by Ron Rivest.

In some implementations, one or more functions of the cryptographic module 134 may be executed within dedicated hardware security modules, within a protected operating system mode, within a protected mode of the processor 204, and so forth. For example, the functions of the cryptographic module 134 may be executed using the TrustZone technology as promulgated by ARM Holdings PLC of Cambridge, England.

The fabrication control module 138 may also be stored in the memory 218. The fabrication control module 138 is configured to use the (unencrypted or decrypted) fabrication instructions 146 to direct operation of the fabrication system 112 or other systems of the AFD 102. For example, the fabrication control module 138 may process the fabrication instructions 146 to direct motion of the extruder 112(1), control the amount of the feedstock material 128 as processed by the feedstock handler 112(2), and so forth. As described above, the fabrication instructions 146 may include one or more unencrypted fabrication instructions 228, encrypted fabrication instructions 126, or decrypted fabrication instructions 136. The fabrication instructions 146 may be stored as a single file or container, or the fabrication instructions 146 may be stored as multiple files or objects. In other implementations, other data structures may be used to store the fabrication instructions 146. In some implementations, the fabrication control module 138 may be implemented at least in part in hardware, such as controllers, processors, and so forth.

The fabrication control module 138 may be configured to access tag data 226 as stored by the tag 122 of the starter 116. The tag data 226 may comprise one or more of a starter identification, object identification, serial number, and so forth. For example, the fabrication control module 138 may access the tag data 226 and communicate with the computing device 142 to confirm that fabrication of the object 104 is permitted.

In some implementations, the starter 116 may omit the starter memory 124, the encrypted fabrication instructions 126, or both. In this implementation, the communication module 224 may use the cryptographic key 132 to establish an encrypted connection with the server or other computing device 142. By way of the encrypted connection, the AFD 102 may provide an identification value such as retrieved from the tag 122. The computing device 142 may respond to the identification value by providing additional fabrication instructions 146. The AFD 102 may receive the fabrication instructions 146. The fabrication control module 138 may then use the fabrication instructions 146 as received from the computing device 142 to direct operation of the fabrication system 112. For example, the instructions may direct the extruder 112(1) to fabricate at least a portion of the object 104 on the build platform 108 from the feedstock material 126.

Other modules 230 may also be present in the memory 218, as well as other data 232 in the data store 222. For example, the other modules 230 may include digital rights management module configured to restrict access to the encrypted fabrication instructions 126. The other data 232 may include user preferences, user selected customizations of the object, and so forth. For example, the user may specify a particular hat from a selection of hats to be fabricated as the additional element 114. In another example, the user preferences may specify various trade-offs between quality of the object 104 fabricated and fabrication time. Continuing the example, the user may accept an object 104 having a lower quality of surface finish but that is finished in one half of the time, compared to the same object 104 fabricated with a higher quality of surface finish at a longer time.

Figure 3:
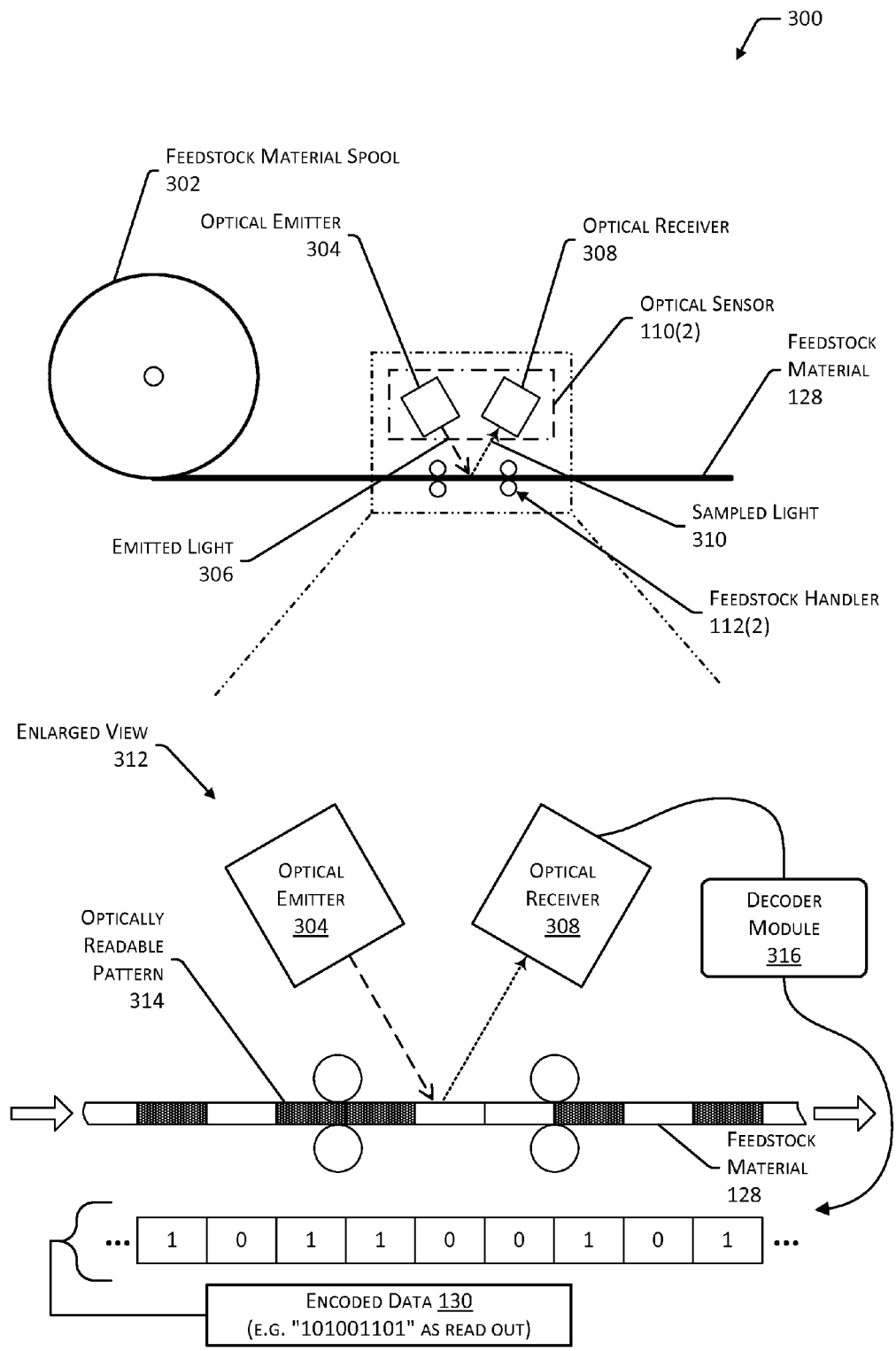
FIG. 3 illustrates a portion of the automated fabrication device configured to retrieve encoded data, such as a cryptographic key, from at least a portion of feedstock material in the starter.

FIG. 3 illustrates a portion 300 of the AFD 102 configured to retrieve encoded data 130 from at least a portion of feedstock material 128. As described above, the feedstock material 128 or portion thereof may be included with the starter 116. In the following illustrations, the feedstock material 128 is depicted as a filament or tape. However, in other implementations, feedstock material 128 may comprise pellets, sheets, gels, and so forth.

A feedstock material spool 302 stores the least a portion of the feedstock material 128. As described above, in some implementations, the feedstock material spool 302 may be incorporated within the starter 116 or portion thereof. As the feedstock material 128 is dispensed from the feedstock material spool 302, it may pass through one or more portions of the feedstock handler 112(2) mechanism, such as guide rollers as depicted here. In this implementation, the optical sensor 110(2) comprises an optical emitter 304 configured to generate emitted light 306 and an optical receiver 308 configured to receive sampled light 310. For example, the optical emitter 304 may comprise a light emitting diode, an incandescent lamp, electroluminescent light, a laser, and so forth. The optical receiver 308 is configured to detect sampled light 310 as reflected, fluoresced, and so forth, by the feedstock material 128. For example, the optical receiver 308 may comprise a photodetector, photodiode, complementary metal oxide semiconductor, charge coupled device, and so forth. The optical sensor 110(2) may operate using one or more of infrared, visible, ultraviolet, or other wavelengths of light.

An enlarged view 312 depicts the apparatus in more detail. As the feedstock material 128 moves from left to right in this figure, an optically readable pattern 314 may be detected by the optical sensor 110(2). For clarity of illustration, additional sensors have been omitted, such as feed sensors indicating a linear measurement of feedstock material 128 that has been dispensed.

In this illustration, portions of the feedstock material 128 are optically darker or lighter with these variations used to encode binary values. For example, the zeroes may be indicated by a white portion while ones are indicated by a dark portion of the feedstock material 128. As feedstock material 128 is passed through the optical sensor 110(2), a decoder module 316 is configured to generate a representation of the encoded data 130. For example, the decoder module 316 may generate a bitstream. The decoder module 316 may perform one or more other operations functions including, but not limited to, error correction, parity checks, and so forth.

In one implementation, the variations in the feedstock material 128 comprising the optically readable pattern 314 may be surface features of feedstock material 128, such as a coating, paint, or sheath applied to the exterior of the feedstock material 128. In another implementation, the variations in the feedstock material 128 may exist beyond the surface, such as throughout the cross-section of the feedstock material 128.

In other implementations, the encoded data 130 may be represented by other features of feedstock material 128. For example, surface contours of the feedstock material 128 or portion thereof may be used to encode information. Continuing example, pits and grooves in the surface of the feedstock material 128 may be used to store the encoded data 130. In these other implementations, the other sensors 110 such as described above may be used to read the encoded data 130.

Figure 4:
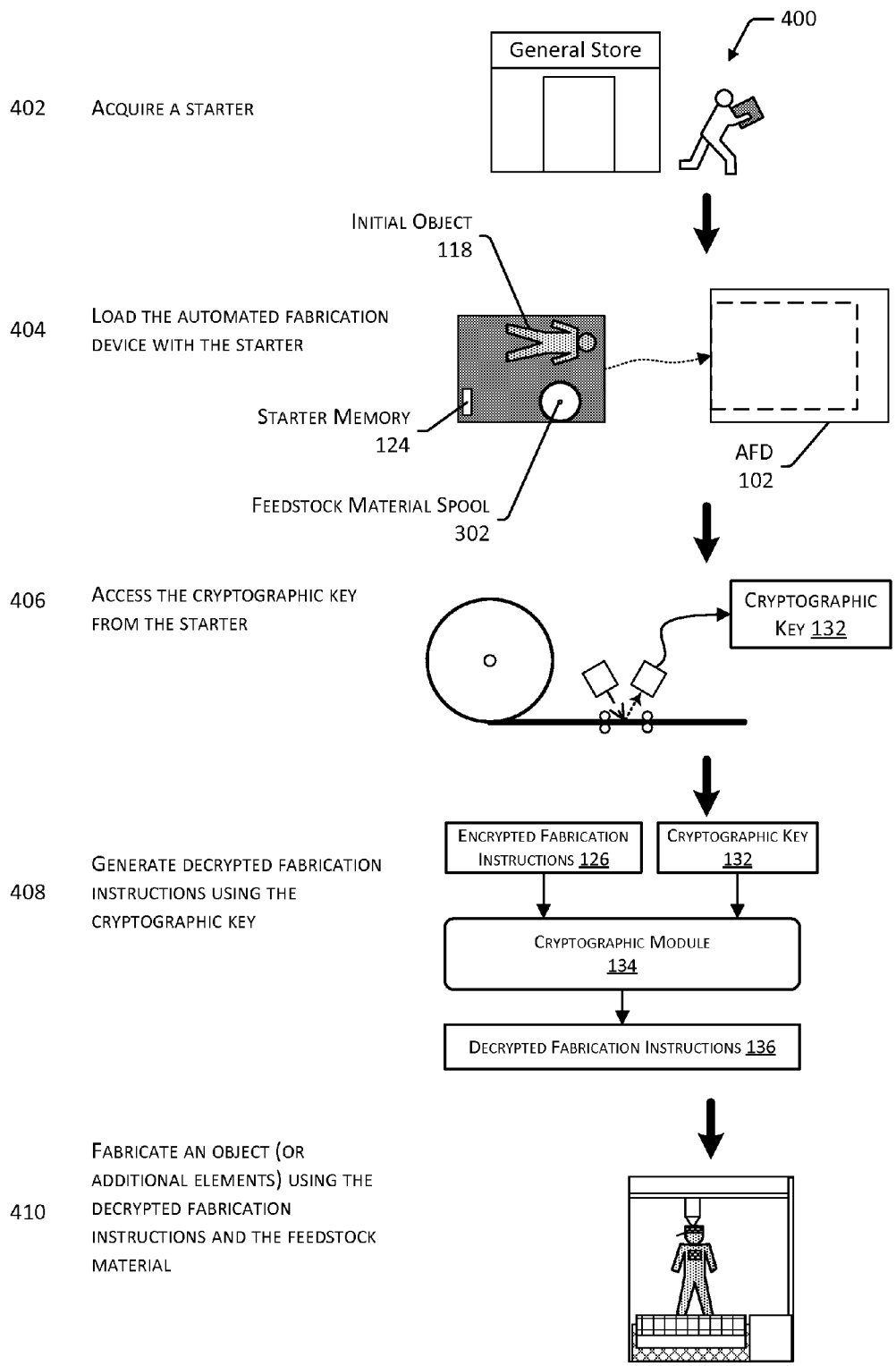
FIG. 4 illustrates a scenario in which a starter is used to fabricate an object.

FIG. 4 illustrates a scenario 400 in which a starter 116 is used to fabricate an object 104. In this scenario, at 402, the user has acquired a starter 116. For example, the starter 116 may have been acquired from a store or delivered to the user.

At 404, the starter 116 is loaded into, or otherwise coupled with, the AFD 102. For example, the starter 116 may comprise a cartridge which is inserted into at least a portion of the AFD 102 and is engaged at least in part by the mount 106. As described above, the mount 106 may be configured to retain the build platform 108 during operation. In other implementations, a receptacle, slot, or other feature may be configured to engage the at least a portion of the starter 116. For example, the mount 106 may be arranged within the receptacle and configured to couple to a housing of the starter 116.

At 406, the cryptographic key 132 is accessed from the starter 116. For example, a portion of the feedstock material 128 may be processed through the sensor 110 as described above with regard to FIG. 3, and the encoded data 130 that includes the cryptographic keys 132 may be retrieved. Continuing the example, the sensor 110 may retrieve the cryptographic key 132 encoded in the feedstock material 128 prior to extrusion or other processing by the fabrication system 112.

At 408, decrypted fabrication instructions 136 are generated using the encrypted fabrication instructions 126 and the cryptographic keys 132. In one implementation, the encrypted fabrication instructions 126 may be retrieved from the starter memory 124. In another implementation, the encrypted fabrication instructions 126 may be retrieved from the computing device 142. The AFD 102 may access the encrypted fabrication instructions 126. The cryptographic key 132 is retrieved, and the decrypted fabrication instructions 136 are produced.

At 410, and object 104, or additional elements 114, are fabricated using the decrypted fabrication instructions 136 and the feedstock material 128. The fabrication may take place on at least a portion of the build platform 108. Continuing the example, the additional elements 114 of the hat and backpack may be added to the figurine initial object 118. For example, the extruder 112(1) may use a least a portion of the feedstock material 128 to fabricate at least a portion of the additional elements 114 or other features on the object 104. As the feedstock material 128 is used to fabricate the object 104, the pattern storing the encoded data 130 thereon is destroyed or rendered unavailable for further readout. For example, where the feedstock material 128 comprises a polymer that is extruded, the extrusion process may change the optically readable pattern 314 thereon.

Figure 5:
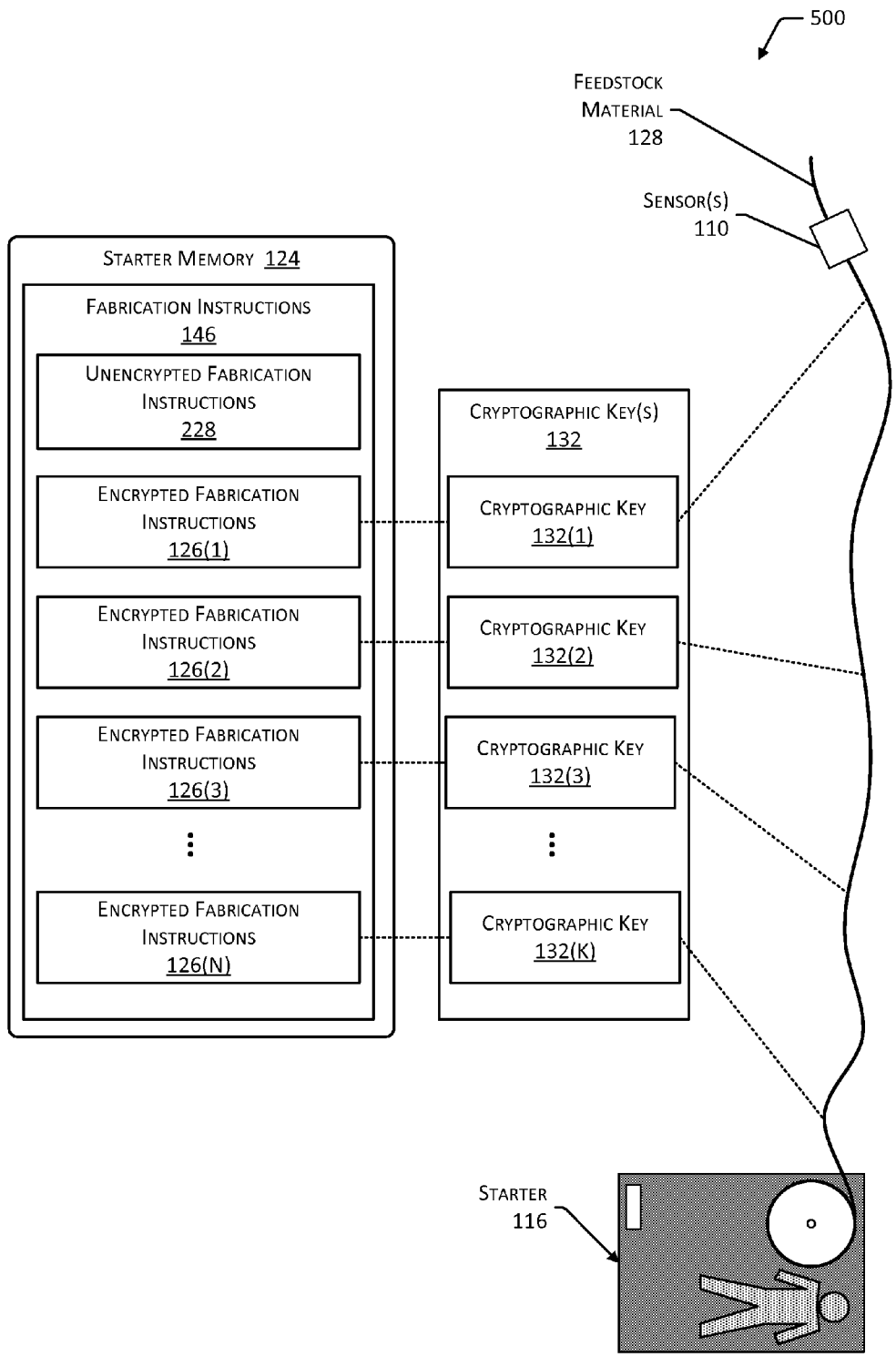
FIG. 5 illustrates a block diagram of cryptographic keys stored using linear or planar feedstock material, and the encrypted fabrication instructions associated with the cryptographic keys.

FIG. 5 illustrates a block diagram 500 of cryptographic keys 132 stored using linear or planar feedstock material 128, and the encrypted fabrication instructions 126 associated with the cryptographic keys 132. In some implementations, the encoded data 130 of the feedstock material 128 may include, or be used as, one or more cryptographic keys 132. The fabrication control module 138 may use the fabrication instructions 146 to fabricate the object 104 as described above.

As illustrated here, the fabrication instructions 146 may include unencrypted fabrication instructions 228. For example, the unencrypted fabrication instructions 228 may include instructions to calibrate the fabrication system 112 or produce a small portion of the object 104. The unencrypted fabrication instructions 228 may be provided to allow time for the fabrication instructions 146 to be retrieved from the computing device 142, to consume at least a portion of the feedstock material 128 such that the encoded data 130 may be read there from by the sensors 110, and so forth. For example, the unencrypted fabrication instructions 228 may be configured to use enough of the feedstock material 128 such that enough length of the linear feedstock material 128 passes the sensor 110 allowing retrieval of the cryptographic key 132(1).

As depicted in this illustration, the feedstock material 128 may include a plurality of cryptographic keys 132(1), 132(2), 132(3), . . . 132(K). One or more of the plurality of cryptographic keys 132 may be used by the cryptographic module 134 to decrypt corresponding encrypted fabrication instructions 126(1), 126(2), 126(3), . . . , 126(N). Each portion or block of unencrypted fabrication instructions 126 may be encrypted using one or more of the cryptographic keys 132. In one implementation, the encrypted fabrication instructions 126 may be encrypted using a stream cipher. In some implementations, the cryptographic keys 132 or the encryption used may be concatenative, such that decryption of the encrypted fabrication instructions 126(3) is dependent at least in part on cryptographic keys 132(1), 132(2), and 132(3).

In some implementations, the use of several cryptographic keys 132 in the feedstock material 128 may be used to enforce compliance with particular material standards for the fabrication of the object 104. For example, an attempt to use counterfeit or third-party feedstock material 128 that omits the encoded data 130 would result in failure of the fabrication, due to the absence of the encoded data 130, such as the cryptographic keys 132.

Figure 6:
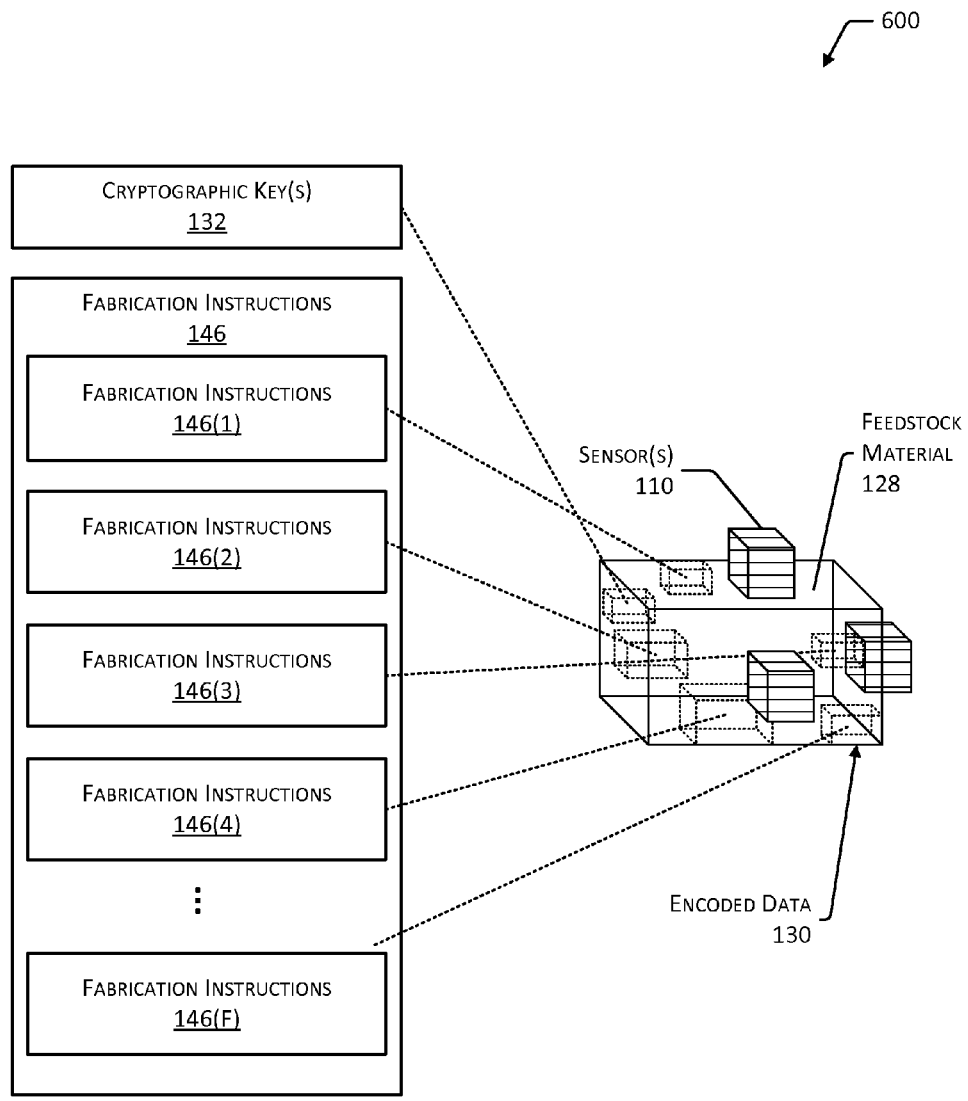
FIG. 6 illustrates a block diagram of storing data, for use during fabrication, in a solid, semi-solid, or layered feedstock material.

FIG. 6 illustrates a block diagram 600 of storing encoded data 130 for use during fabrication. In this illustration, the feedstock material 128 may comprise a solid, semi-solid, or layered feedstock material. For example, the feedstock material 128 may comprise a gel. One or more sensors 110 may be configured to read one or more features within the feedstock material 128. For example, a laser may be used to scan a volume of the feedstock material 128 while a photodetector may be used to detect a variation of the feedstock material 128 that stores information.

As depicted here, cryptographic keys 132 and portions of the fabrication instructions 146(1), 146(2), 146(3), 146(4), . . . , 146(F) are stored in respective different volumes of the feedstock material 128. As described above, the features or aspects of the feedstock material 128 that store information may be inherent or impressed upon the feedstock material 128.

As described above, in some implementations, the feedstock material 128 may be configured to store fabrication instructions 146 instead of, or in addition to, other data such as the cryptographic keys 132.

Figure 7:
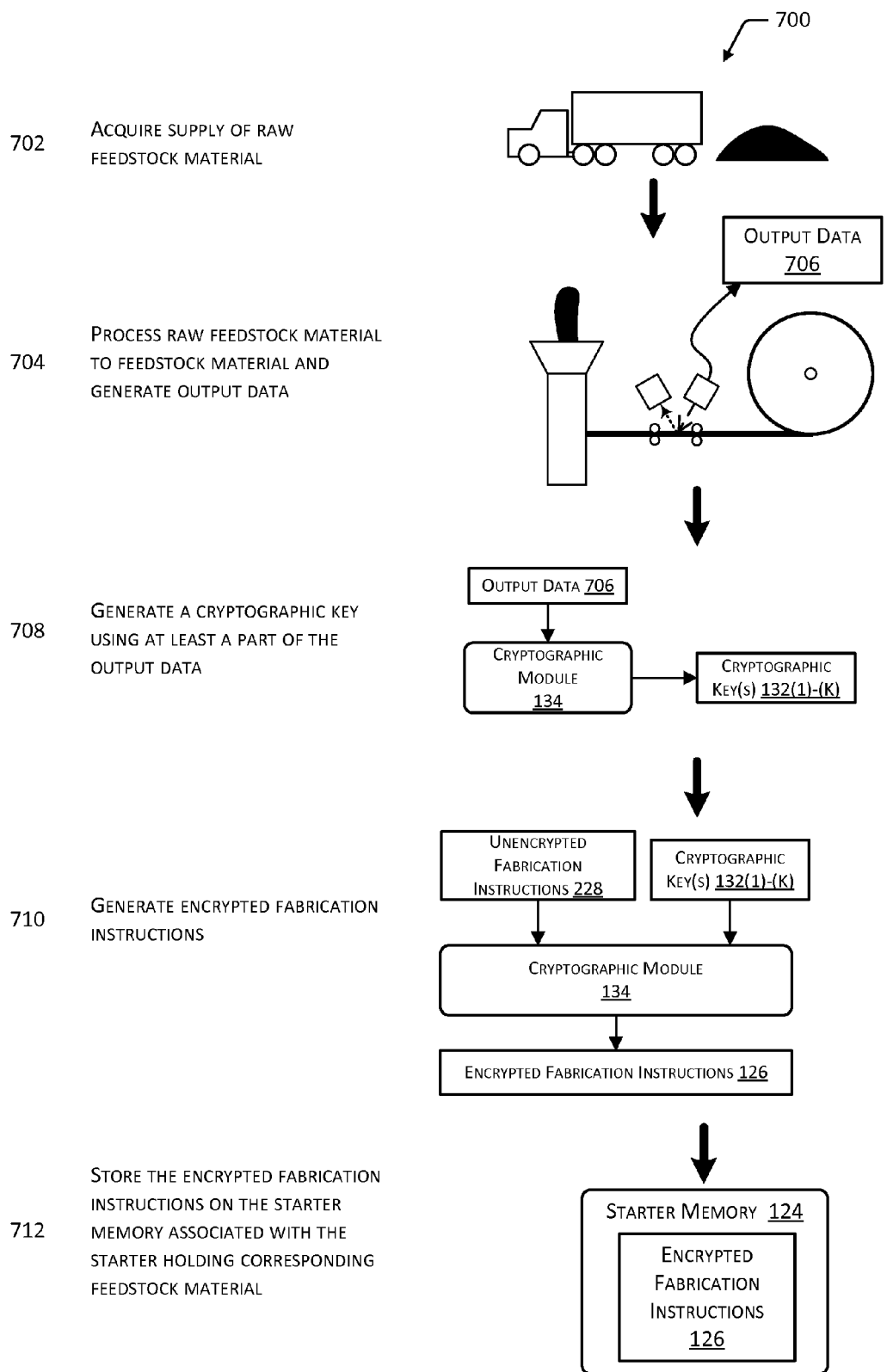
FIG. 7 illustrates a scenario in which output data is generated from the feedstock material and used to generate a cryptographic key to encrypt fabrication instructions prior to use by the automated fabrication device.

FIG. 7 illustrates a scenario 700 in which output data is generated from the feedstock material 128. The output data may then be used to generate a cryptographic key 132 to generate encrypted fabrication instructions 126 prior to use by the AFD 102.

At 702, a supply of raw feedstock material is acquired. At 704, the raw feedstock material is processed to produce feedstock material 128 suitable for use by the AFD 102. For example, the processing may include forming the raw feedstock material into filaments, tape, pellets, and so forth. In some implementations, the feedstock material 128 may include materials of different composition, color, or other characteristics. For example, a portion of the feedstock material 128 may be green plastic to make green parts of the object 104 while another portion of the feedstock material 128 may be blue plastic to make blue parts. Different feedstock materials 128 may be joined together, such that a single feedstock material spool 302. Continuing the example, the spool may include feedstock material 128 as a filament which is first green, then blue, such that corresponding parts from the extruder 112(1) extruded during fabrication will be green then blue. In other implementations, feedstock material 128 of different characteristics may be provided on different spools.

During processing, the sensor 110 is used to generate output data 706. For example, the optical sensor 110(2) may be configured to generate output data 706 indicative of changes in the surface color, texture, contour, and so forth, of the filament as it is wound onto the feedstock material spool 302. The output data 706 may be random or pseudorandom, such that no particular information has been impressed upon it. For example, the output data 706 may comprise a bitstream that represents random variations of the surface contour occurring during the processing of the raw feedstock material.

At 708, one or more cryptographic keys 132 are generated using at least a part of the output data 706. For example, the cryptographic module 134 may use the data output 706 as input and generate one or cryptographic keys 132(1)-(K). The output data 706 may be used without change, the output data 706 may be used as an input to a pseudorandom number generator to produce the cryptographic key 132, and so forth.

At 710 encrypted fabrication instructions 126 are generated using the cryptographic keys 132. For example, the unencrypted fabrication instructions 228 may be encrypted by the cryptographic module 134 using the cryptographic key 132.

At 712, the encrypted fabrication instructions 126 are stored on the starter memory 124 associated with the starter 116 holding corresponding feedstock material 128. For example, the 30 meters (m) length of feedstock material 128 filament corresponding to the output data 706 and the starter memory 124 storing the encrypted fabrication instructions 126 generated using the output data 706 may be packaged together.

Figure 8:
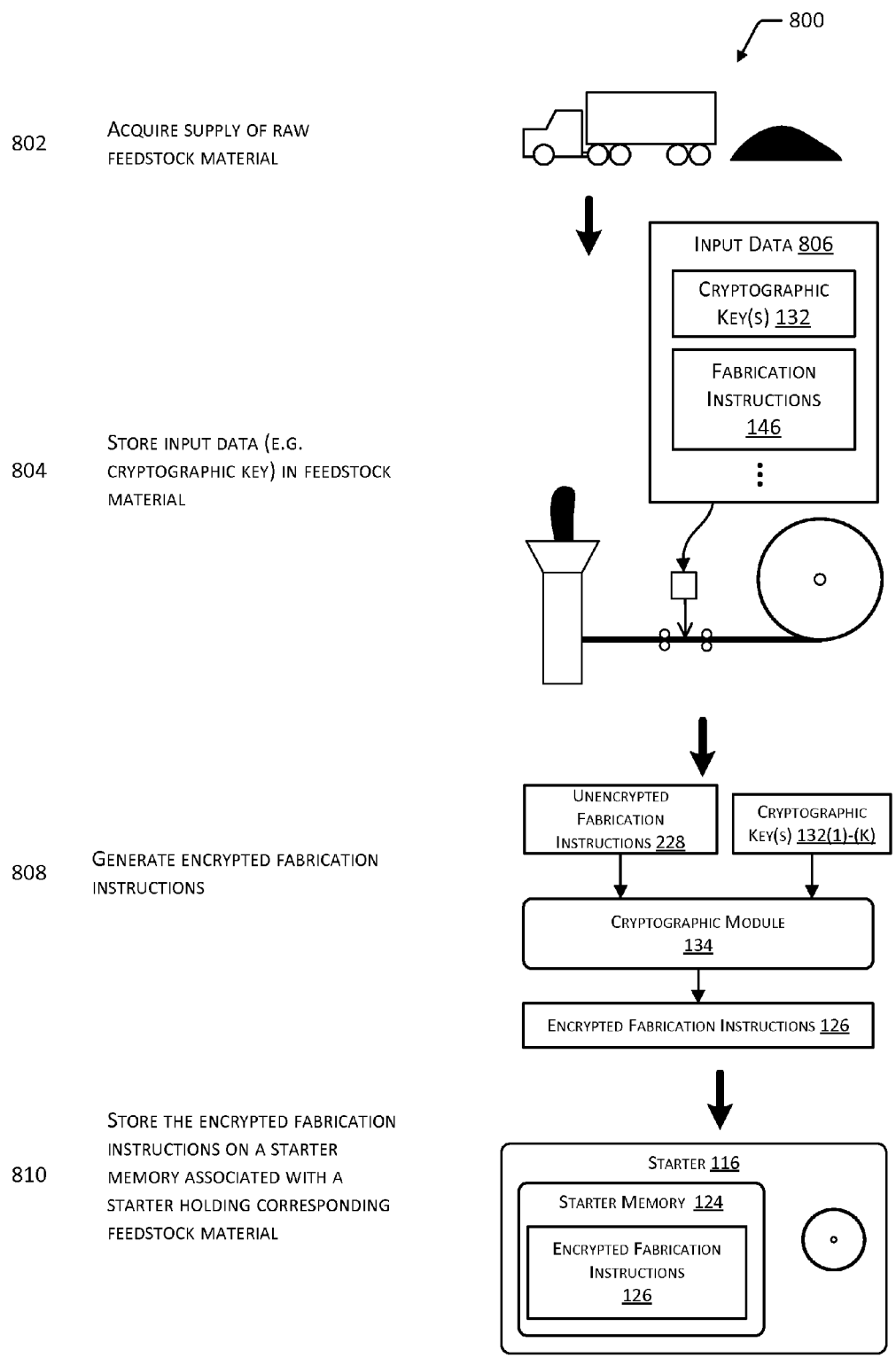
FIG. 8 illustrates a scenario in which encoded data is stored by the feedstock material prior to use by the automated fabrication device.

FIG. 8 illustrates a scenario 800 in which encoded data 130 is impressed onto or within the feedstock material 128 for storage, prior to use by the AFD 102. In this scenario, the feedstock material 128 is used as a form of CRSM.

At 802, supply of raw feedstock material is acquired. In some implementations, previously processed but informationally "blank" feedstock material 128 may be acquired.

At 804, input data 806 is stored in the feedstock material 128. For example, the input data 806 may comprise cryptographic keys 132, fabrication instructions 146, and so forth. For example, as the feedstock material 128 in the form of a tape or filament is taken up by the feedstock material spool 302, a light source such as a laser may be used to form pits and gouges on at least a portion of the surface of the feedstock material 128. These pits and gouges may represent binary zeroes and ones, thus storing data on the feedstock material 128. In another example, where the feedstock material 128 comprises a volumetric material such as described above with regard to FIG. 6, two or more beams of light may be focused on particular points within the volume to affect a detectable change suitable for storing data. For example, at the confluence of the two or more beams, a phase change may result in an optical property such as polarization, color, and so forth, of a particular portion of the volumetric feedstock material 128 to be changed. This change may then be detected by eliminating the feedstock material 128 and using a photodetector to read the changed portion.

At 808, encrypted fabrication instructions 126 are generated using the cryptographic keys 132. For example, the unencrypted fabrication instructions 228 may be encrypted by the cryptographic module 134 using the cryptographic key 132.

At 810, the encrypted fabrication instructions 126 are stored on the starter memory 124 associated with the starter 116 holding the corresponding feedstock material 128. For example, the 15 m length of feedstock material 128 filament storing the input data 806 and the starter memory 124 storing the encrypted fabrication instructions 126 generated using the cryptographic key 132 may be packaged together.

Figure 9:
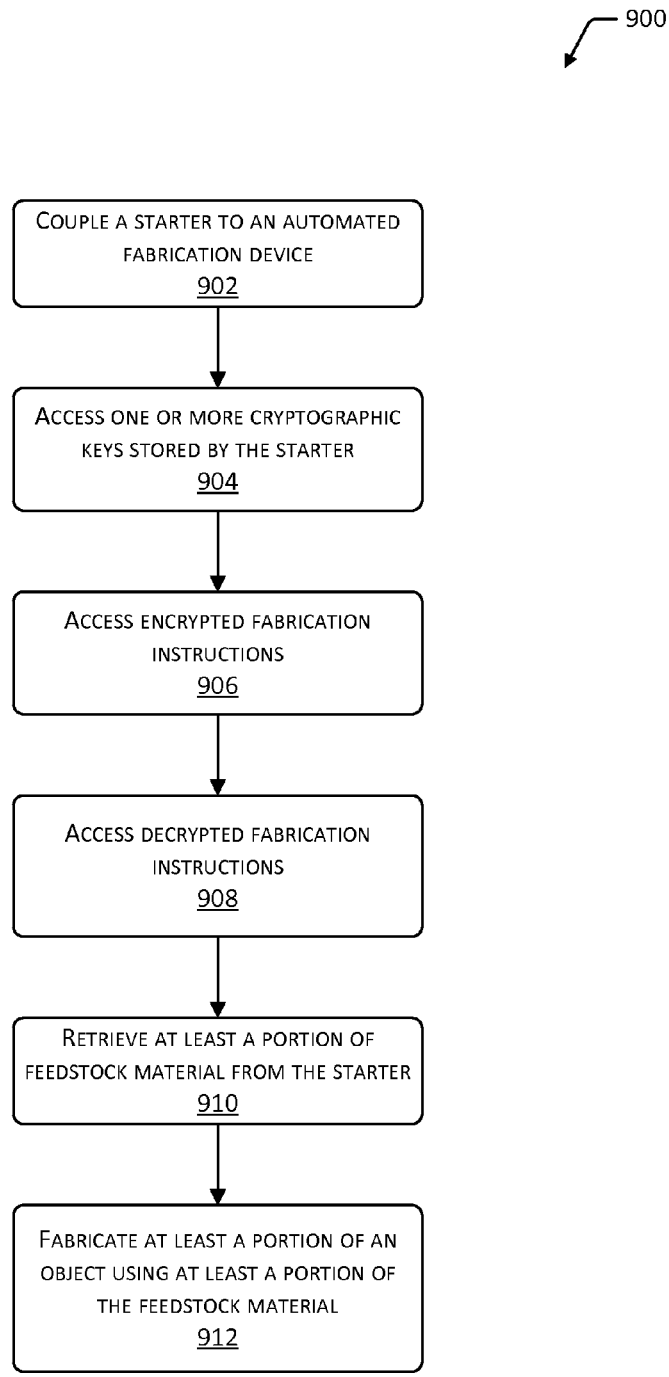
FIG. 9 illustrates a flow diagram of a process to fabricate an object from a starter.

FIG. 9 illustrates a flow diagram 900 of a process to fabricate an object 104 from a starter 116 using an AFD 102. The process may be implemented at least in part using the system 100 as described above.

Block 902 couples a starter 116 to an AFD 102. The coupling may comprise establishing a mechanical connection between at least a portion of the starter 116 and the AFD 102. For example, the build platform 108 may be mechanically engaged with the mount 106. In one implementation, the coupling may include the engagement of one or more interference-fit parts, locking lugs, cams, and so forth. The coupling may also include establishing communication with the starter memory 124. For example, a wired USB connection, a wireless Bluetooth connection, and so forth, may be established with starter memory 124.

As described above, in some implementations, the starter 116 may include feedstock material 128. The feedstock material 128 provided with the starter 116 may be insufficient to complete fabrication of the object 104. In this situation, additional feedstock material 128 may be accessed by the AFD 102 to complete fabrication.

As also described above, the starter 116 may also include a build platform 108. The build platform 108 may be configured to support at least a portion of the object 104 during fabrication.

Block 904 accesses one or more cryptographic keys 132 stored by the starter 116. For example, the one or more cryptographic keys 132 may be stored on or by at least a portion of the feedstock material 128.

As described above, such as with regard to FIG. 3, the sensor 110 may be configured to read the encoded data 130 from the feedstock material 128. The encoded data 130 may include one or more cryptographic keys 132.

Block 906 accesses encrypted fabrication instructions 126. For example, the encrypted fabrication instructions 126 may be retrieved from the CRSM starter memory 124 of the starter 116. In another example, the encrypted fabrication instructions 126 may be retrieved from an external device such as the computing device 142. In yet another example, a portion of the encrypted fabrication instructions 126 may be retrieved from the starter memory 124 while another portion may be retrieved from the computing device 142.

Additional information may also be retrieved from the starter 116. Information about one or more of the structure of the starter 116, composition of the starter 116, or configuration of the starter 116 may be retrieved. The structure of the starter 116 may comprise information indicative of the shape of the initial object 118, shape of scaffolding 120, and so forth. The composition of the starter 116 may comprise information indicative of the type of feedstock material 128, lot or batch numbers associated with feedstock material 128, and so forth. The configuration starter provides information indicative of the physical arrangement of elements within the starter 116. For example, the configuration of the starter 116 may provide information about where parts are stored in the starter 116 for use by a pick and place apparatus of the fabrication system 112. In another example, the configuration may comprise information such as a pose or physical arrangement of the initial object 118.

Block 908 accesses decrypted fabrication instructions 136. The decrypted fabrication instructions 136 may be generated by decrypting the encrypted fabrication instructions 126 using the one or more cryptographic keys 132. In another example, the unencrypted fabrication instructions 228 may be retrieved.

Block 910 retrieves a least a portion of the feedstock material 128 from the starter 116. As described above, as the feedstock material 128 is consumed during fabrication, at least a portion of the encoded data 130 is destroyed, rendered unusable, or otherwise becomes inaccessible for further data retrieval.

Block 912 fabricates, or initiates fabrication of, at least a portion of an object 104 using at least a portion of the feedstock material 128. As described above, fabricating at least a portion of the 3D object 104 using the decrypted fabrication instructions 136 may include one or more processes performed by the fabrication system 112. These processes may include one or more of the following: depositing a feedstock material 128, sintering a feedstock material 128, hardening a feedstock material 128, ablating a feedstock material 128, or milling a feedstock material 128. For example, photolithographic techniques may be used to harden a liquid or gel to form a portion of the object 104.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a starter comprising:
      a build platform;
      a non-transitory computer-readable storage medium (CRSM) storing encrypted fabrication instructions for automated fabrication of an object, wherein the encrypted fabrication instructions are encrypted using a cryptographic key; and
      feedstock material for fabrication of the object, wherein the feedstock material stores the cryptographic key;
   an additive three-dimensional printer comprising:
      a mount configured to retain the build platform during operation;
      an extruder configured to use the feedstock material to fabricate the object; and a sensor configured to retrieve the cryptographic key stored in the feedstock material prior to extrusion by the extruder; and a device to:
access the encrypted fabrication instructions stored by the CRSM of the starter;
retrieve the cryptographic key;
decrypt the encrypted fabrication instructions to produce decrypted fabrication instructions; and
direct, using the decrypted fabrication instructions, the extruder to fabricate the object on the build platform from the feedstock material, wherein use of the feedstock material destroys the cryptographic key stored therein.

2. The system of claim 1, wherein the starter further comprises:
a scaffolding configured to support at least a portion of the object during fabrication; and
an initial object comprising one or more previously completed elements of the object.

3. The system of claim 1, wherein the starter further comprises a tag storing an identification value;
wherein the additive three-dimensional printer further comprises a tag reader configured to access the identification value; and
wherein the device is further configured to:
establish an encrypted connection with a server using the cryptographic key;
provide the identification value to the server;
receive additional fabrication instructions from the server; and
direct, using the additional fabrication instructions, the extruder to fabricate from the feedstock material the object on the build platform.

4. A system comprising:
a starter, the starter comprising:
a memory storing computer-executable encrypted instructions for fabricating at least a portion of an object using an automated fabrication device; and
feedstock material that stores encoded data that is used to decrypt encrypted computer-executable instructions, and wherein the feedstock material is used by the automated fabrication device to fabricate the at least portion of the object.

5. The system of claim 4, the starter further comprising a build platform configured to support the at least portion of the object during the fabrication.

6. The system of claim 4, wherein the feedstock material stores the encoded data, and further wherein use of the feedstock material to fabricate the at least portion of the object destroys at least a portion of the encoded data.

7. The system of claim 6, further comprising:
a sensor configured to read the encoded data from the feedstock material;
a hardware processor in communication with the memory and the sensor, wherein the hardware processor is configured to execute the computer-executable instructions to:
retrieve the encoded data; and
decrypt the encrypted computer-executable instructions using the encoded data to generate decrypted computer-executable instructions.

8. The system of claim 4, the starter further comprising: one or more scaffolding members configured to support the at least portion of the object during the fabrication.

9. The system of claim 4, the starter further comprising:
an initial object comprising a previously fabricated portion of the object.

10. The system of claim 4, wherein the feedstock material comprises one or more of:
a polymer,
a metal, or
a ceramic.

11. The system of claim 4, the starter further comprising a tag storing data indicative of the object, the tag comprising one or more of:
a machine-readable optical code, or
a radio-frequency identification tag.

12. The system of claim 4, further comprising:
the automated fabrication device comprising:
a receptacle configured to mechanically couple to at least a portion of the starter;
a fabrication assembly configured to use the feedstock material to fabricate the at least portion of the object;
a hardware processor configured to:
retrieve the computer-executable instructions from the memory;
use at least a portion of the feedstock material to fabricate the at least portion of the object.

13. The system of claim 4, further comprising:
the automated fabrication device comprising:
a fabrication assembly configured to use the feedstock material to fabricate the at least portion of the object;
a sensor configured to read the encoded data stored by the feedstock material;
a hardware processor to:
retrieve the computer-executable instructions from the memory, wherein the computer-executable instructions are encrypted;
retrieve the encoded data stored by the feedstock material;
generate decrypted fabrication instructions from the computer-executable instructions using at least a portion of the encoded data; and
fabricate the at least portion of the object using the decrypted fabrication instructions and at least a portion of the feedstock material.

14. The system of claim 4, further comprising:
an automated fabrication device, the automated fabrication device comprising:
a receptacle to mechanically couple to at least a portion of the starter; and
a communication device to communicate with the memory storing computer-executable instructions for fabricating the at least portion of the object using the automated fabrication device.

15. A device comprising:
a memory storing encrypted fabrication instructions for automated fabrication of an object, wherein the encrypted fabrication instructions are encrypted using a cryptographic key;
an automated fabrication device, the automated fabrication device comprising:
a fabrication assembly to use feedstock material to fabricate at least a portion of the object;
a sensor to read encoded data stored by the feedstock material; and
a hardware processor to:
access the cryptographic key stored on the feedstock material;
access the encrypted fabrication instructions;
generate decrypted fabrication instructions from the encrypted fabrication instructions using the cryptographic key; and fabricate, using the automated fabrication device, at least a portion of a three-dimensional object using the decrypted fabrication instructions.

16. The device of claim 15, the accessing the encrypted fabrication instructions comprises:
retrieve the encrypted fabrication instructions from the memory of the device.

17. The system of claim 15, the hardware processor further to:
retrieve, from the memory, information indicative of one or more of:
structure of the device,
composition of the device, or
configuration of the device.

18. The device of claim 15, the device further comprising:
a scaffolding to support at least a portion of the object during the fabrication; and
an initial object comprising one or more previously completed elements of the object.

19. The device of claim 15, wherein the fabricating comprises one or more of:
depositing the feedstock material,
sintering the feedstock material,
hardening the feedstock material,
ablating the feedstock material, or
milling the feedstock material.

20. The device of claim 15, the hardware processor further to:
retrieve the feedstock material from a starter to fabricate at least a portion of the three-dimensional object.

* * * * *